(12) United States Patent
Hochstetler et al.

(10) Patent No.: US 11,349,363 B2
(45) Date of Patent: May 31, 2022

(54) LAMINATION FOR MAIN GENERATOR ROTOR IN AN INTEGRATED DRIVE GENERATOR

(71) Applicant: Hamilton Sundstrand Corporation, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 297 days.

(21) Appl. No.: 16/806,303

(22) Filed: Mar. 2, 2020

(65) Prior Publication Data

US 2020/0303981 A1    Sep. 24, 2020

Related U.S. Application Data

(62) Division of application No. 15/862,169, filed on Jan. 4, 2018, now Pat. No. 10,615,653.

(51) Int. Cl.
*H02K 1/32* (2006.01)
*F02C 7/32* (2006.01)
(Continued)

(52) U.S. Cl.
CPC ............... *H02K 1/32* (2013.01); *F02C 7/32* (2013.01); *F16H 37/02* (2013.01); *H02K 1/28* (2013.01); *H02K 7/116* (2013.01); *H02K 7/1823* (2013.01); *H02K 15/0006* (2013.01); *H02K 15/0012* (2013.01); *H02K 15/022* (2013.01); *H02K 3/20* (2013.01); *H02K 7/20* (2013.01); *H02K 2213/03* (2013.01)

(58) Field of Classification Search
CPC ...... H02K 1/32; H02K 15/022; H02K 7/1823; H02K 1/28; H02K 15/0012; H02K 7/116; H02K 15/0006; H02K 2213/03; H02K 7/20; H02K 3/20; F02C 7/32; F16H 37/02
USPC ............................................. 310/59, 216.092
See application file for complete search history.

(56) References Cited

U.S. PATENT DOCUMENTS

| 2,752,518 A | 6/1956 | Ringland |
| 2,872,605 A | 2/1959 | Moore et al. |

(Continued)

FOREIGN PATENT DOCUMENTS

| CN | 103956875 | 2/2017 |
| JP | H01152944 | 6/1989 |

OTHER PUBLICATIONS

The Extended European Search Report for EP Application No. 19150178.2, dated May 13, 2019.

*Primary Examiner* — John K Kim
(74) *Attorney, Agent, or Firm* — Carlson, Gaskey & Olds, P.C.

(57) ABSTRACT

A lamination for use in an integrated drive generator is formed from a plurality of plates having a body including a pair of opposed cylindrical surfaces. Non-cylindrical ditches are defined circumferentially intermediate the pair of cylindrical surfaces. A plurality of passages are formed in an outer periphery of the cylindrical surfaces including relatively large holes extending through a slot to the outer periphery. Grooves are formed intermediate the relatively large holes.

4 Claims, 3 Drawing Sheets

(51) Int. Cl.
*H02K 15/02* (2006.01)
*H02K 15/00* (2006.01)
*H02K 7/116* (2006.01)
*F16H 37/02* (2006.01)
*H02K 1/28* (2006.01)
*H02K 7/18* (2006.01)
*H02K 3/20* (2006.01)
*H02K 7/20* (2006.01)

(56) References Cited

U.S. PATENT DOCUMENTS

| | | | |
|---|---|---|---|
| 3,106,654 A | 10/1963 | Wesolowski | |
| 3,127,532 A | 3/1964 | Gynt | |
| 3,375,385 A | 3/1968 | Young | |
| 3,749,991 A | 7/1973 | Kuniyoshi | |
| 3,797,106 A | 3/1974 | Costello | |
| 4,329,609 A | 5/1982 | Allegre et al. | |
| 5,144,182 A | 9/1992 | Lemmer et al. | |
| 6,483,220 B1 * | 11/2002 | Johnsen | H02K 3/18 310/179 |
| 8,427,018 B2 * | 4/2013 | Dutau | H02K 1/20 310/58 |
| 10,615,653 B2 * | 4/2020 | Hochstetler | H02K 15/0006 |
| 2013/0181568 A1 | 7/2013 | Bangura | |
| 2014/0028141 A1 | 1/2014 | DuVal | |
| 2019/0207450 A1 * | 7/2019 | Hochstetler | H02K 15/0012 |
| 2020/0303981 A1 * | 9/2020 | Hochstetler | H02K 1/32 |

\* cited by examiner

LAMINATION FOR MAIN GENERATOR ROTOR IN AN INTEGRATED DRIVE GENERATOR

REFERENCE TO RELATED APPLICATIONS

This application is a divisional of U.S. patent application Ser. No. 15/862,169 filed on Jan. 4, 2018.

BACKGROUND

This application relates to a lamination for a main generator rotor of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

A rotor for the main generator includes a stack of lamination plates. The design of the lamination plates raises challenges.

SUMMARY

A lamination for use in an integrated drive generator has a body formed of a plurality of plates including a pair of opposed cylindrical surfaces. Non-cylindrical ditches are defined circumferentially intermediate the pair of cylindrical surfaces. A plurality of passages are formed in an outer periphery of the cylindrical surfaces including relatively large holes extending through a slot to the outer periphery. Grooves are formed intermediate the relatively large holes.

In addition, an integrated drive generator is disclosed as is a method of replacing a lamination in an integrated drive generator. An integrated drive generator and a method are also disclosed.

These and other features may be best understood from the following drawings and specification.

DETAILED DESCRIPTION

Figure 1:
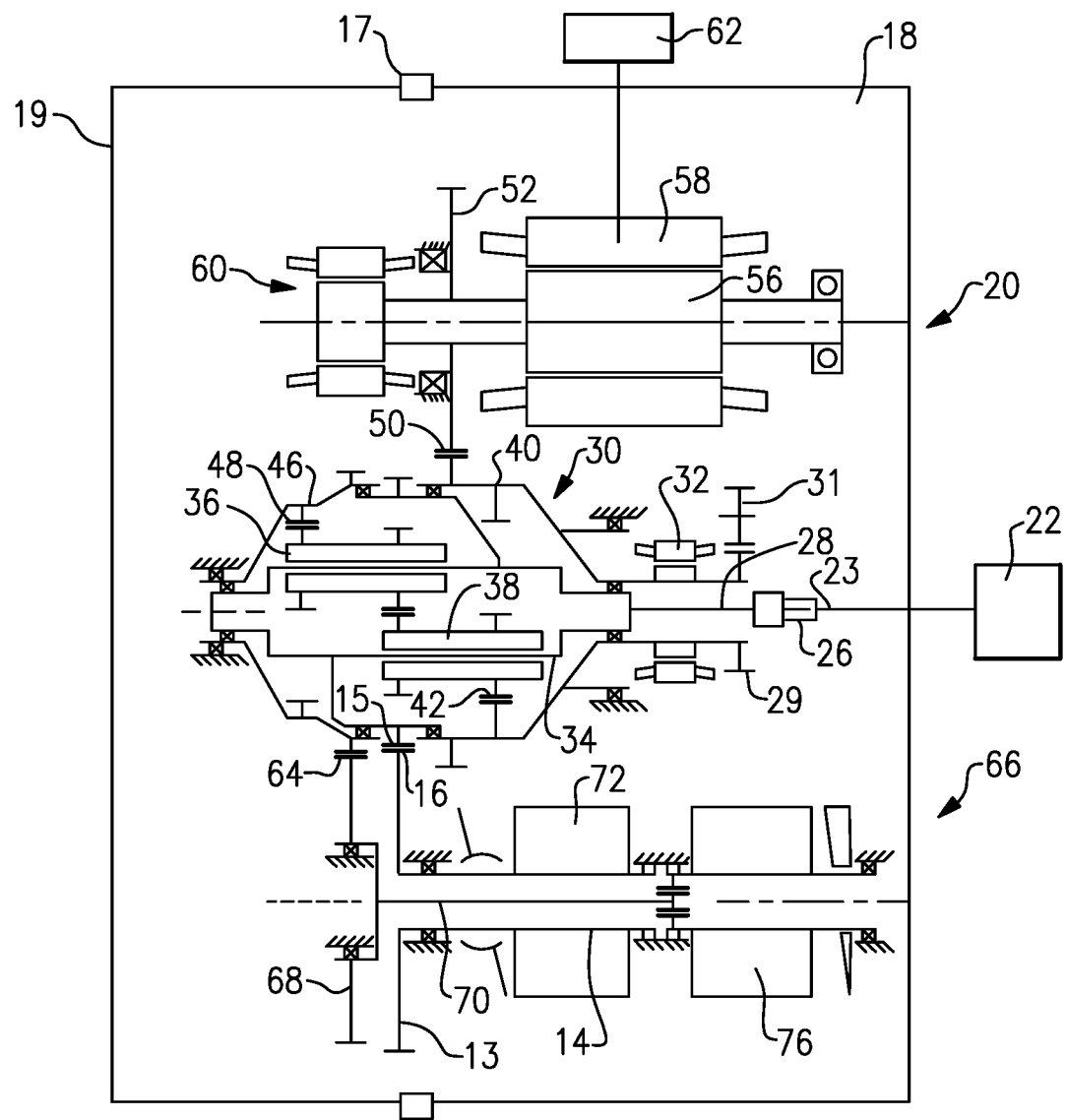
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator 51 having a drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. However, a main generator rotor is unique, as described below. A worker of ordinary skill would recognize that the desired frequency and speed at use 62 would dictate a number of design functions.

Figure 2:
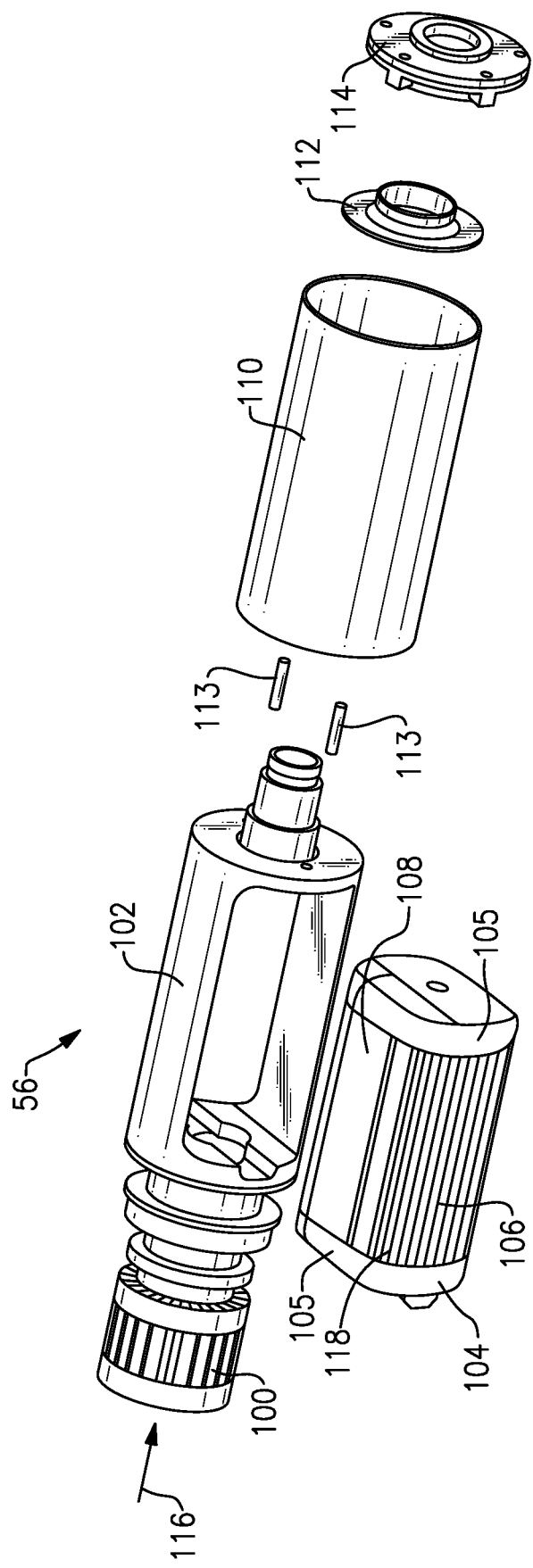
FIG. 2 shows an exploded view of a rotor for a main generator.

FIG. 2 shows the main generator rotor 56. 100 provides a rotor for the exciter 60, as shown in FIG. 1. A shaft 102 secures a rotor section 104 including a lamination 106. The lamination 106 is formed by a plurality of plates 120, disclosed below. The plurality of plates are secured together to a lamination stack 106. Windings 108 extend from ends 105 across the stack and will be received in a ditch in the stack, as described below. A sleeve 110 surrounds the support 102 and the laminations 106. A bearing assembly 114 and an oil deflector ring 112 are shown. Ring 112 also serves as a secondary retention for set screw/oil restrictor 113. As shown at 118, there are a plurality of oil flow passages at an outer periphery of the stack 106. These are provided by grooves and holes as will be described below in each lamination plate. Oil is supplied into an interior of the rotor 56 as shown schematically at 116. That oil will flow through the passages 118 to cool the inside of the sleeve 110.

Figure 3A:
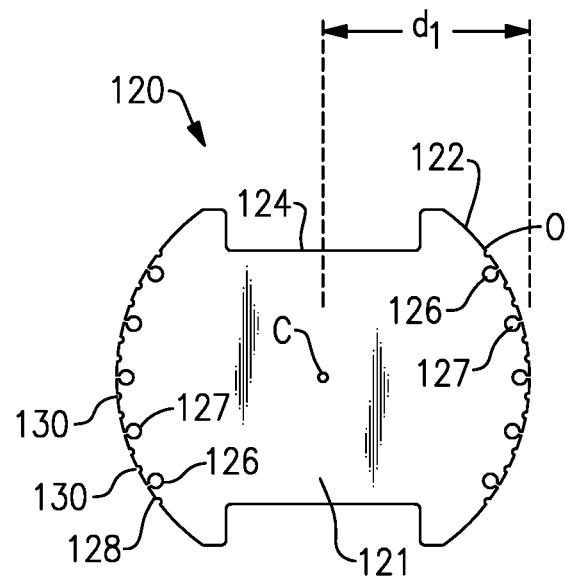
FIG. 3A shows a single lamination plate.

FIG. 3A shows a detail of a single lamination plate 120. As shown, a body 121 has opposed cylindrical portions 122 separated by non-cylindrical ditches 124. The ditches 124 receive the windings 108, as shown above. There are ten holes at the outer periphery O of the cylindrical portion 122. Five holes are shown on each side of the ditches 124. Intermediate outer holes 126 and three inner holes 127, are two grooves 130. Outwardly of the outer holes 126, there is a single groove 128. Grooves 128 and 130 are indexing notches used to stack the plurality of plates. The holes 126 and 127 receive amortisseur bars 200, as shown in phantom in FIG. 3C. The holes 126/127 and a notch 134 provide the passages 118 as described with regard to FIG. 2.

As shown, a radius of the plate between a center point C and the surface 0 is shown as $d_1$. In one embodiment, $d_1$ is 1.878 inches (4.770 centimeters). In embodiments, this and all dimensions come with a tolerance of +/−0.010 inch (0.025 centimeter).

Figure 3B:
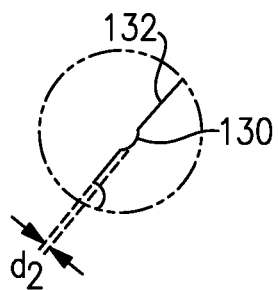
FIG. 3B shows a detail.

As shown in FIG. 3B, the grooves 130 extend inwardly from a face 132 by a distance $d_2$. In one embodiment, $d_2$ was 0.056 inch (0.142 centimeter). The grooves 128 have a similar depth, distance $d_2$.

Figure 3C:
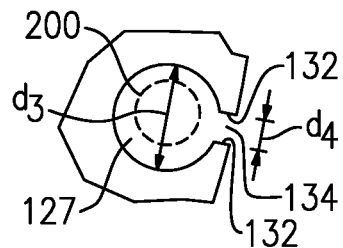
FIG. 3C shows yet another detail.

FIG. 3C shows details of the hole 127. Plate 126 is the same size. Hole 127 extends for a diameter $d_3$ of 0.134 inch (0.340 centimeter). The holes open through an outer slot 134. Between opposed faces 132 of the outer slot 134, a fourth distance $d_4$ is defined. In embodiments, $d_4$ is 0.050 inch (0.127 centimeter).

The passages provided by the holes 126, 127 and slots 134 ensure adequate oil flow to the inner periphery of the rotor sleeve 110.

In embodiments, a ratio of $d_1$ to $d_2$ is between 25 and 40. A ratio of $d_1$ to $d_3$ is between 10 and 20. A ratio of $d_1$ to $d_4$ is between 30 and 45.

A method of replacing a laminations in a main generator rotor in an integrated drive generator comprises the steps of:
a) removing an existing lamination from a main generator rotor in an integrated drive generator. The generator has an input shaft, a gear differential including a carrier shaft operably connected to the input shaft and having a ring gear connected to the main generator rotor. The method further includes the step of replacing the existing lamination. The replacement lamination is formed of a plurality of plates, which include a body having a pair of opposed cylindrical surfaces and non-cylindrical ditches defined circumferentially intermediate the pair of cylindrical surfaces. A plurality of passages are formed in an outer periphery of the cylindrical surfaces. The passages include relatively large holes extending through a slot to the outer periphery. Grooves are formed intermediate the relatively large holes.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of replacing a lamination in a main generator rotor in an integrated drive generator comprising the steps of:
 a) removing an existing lamination plate from a main generator rotor in an integrated drive generator having an input shaft, a gear differential including a carrier shaft operably connected to said input shaft and having a ring gear connected to said main generator rotor;
 b) replacing the existing lamination with a replacement lamination; and
 c) the replacement lamination including a plurality of plates including a body including a pair of opposed cylindrical surfaces and non-cylindrical ditches defined circumferentially intermediate said pair of cylindrical surfaces and a plurality of passages formed in an outer periphery of said cylindrical surfaces, including relatively large holes extending through a slot to said outer periphery, and grooves formed intermediate said relatively large holes, there are five of said enlarged holes within each said circumferential portion, said body defines a first distance from a center axis of said plate to said outer periphery, and said grooves extending inwardly from said outer surface of said plate for a second distance, and a ratio of said first distance to said second distance is between 25 and 40, said large holes extend for a diameter defining a third distance and a ratio of said first distance to said third distance being between 10 and 20.

2. The method of replacing a lamination in a main generator rotor as set forth in claim 1, wherein a fourth distance is defined between opposed faces defining said slot, and a ratio of said first distance to said fourth distance is between 30 and 45.

3. The method of replacing a lamination plate as set forth in claim 2, wherein both said existing lamination and said replacement lamination include a stack of said plates.

4. The method of replacing a lamination plate as set forth in claim 1, wherein both said existing lamination and said replacement lamination include a stack of said plates.

* * * * *